(No Model.)
L. ROBERTS.
PERAMBULATOR.
No. 513,248. Patented Jan. 23, 1894.
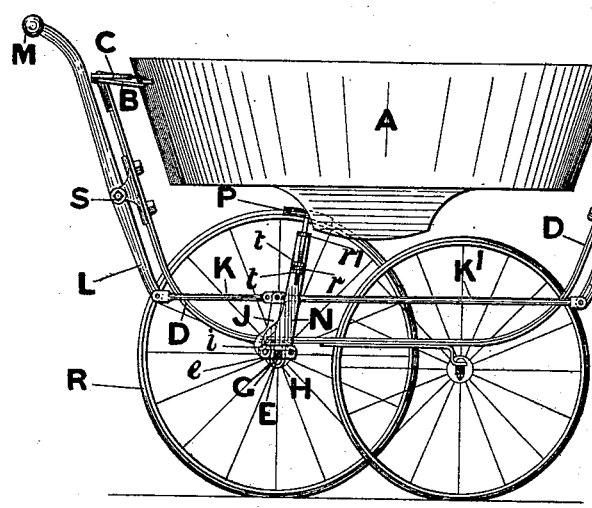
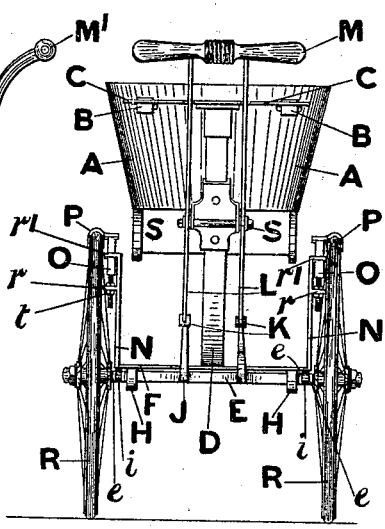
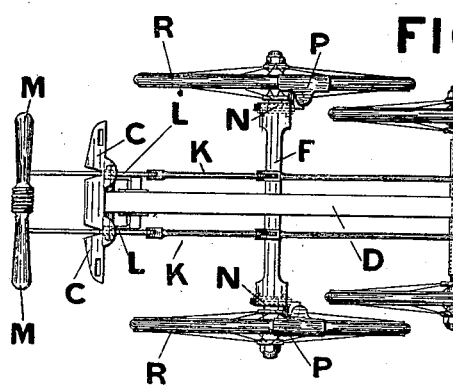
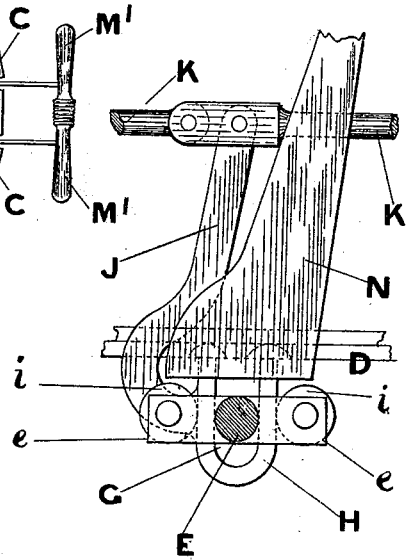
Witnesses
Thomas Durant
A. H. Kelly
Inventor
Luke Roberts
By Church & Church
his Attorneys

UNITED STATES PATENT OFFICE.

LUKE ROBERTS, OF BRADFORD, ENGLAND.

PERAMBULATOR.

SPECIFICATION forming part of Letters Patent No. 513,248, dated January 23, 1894.

Application filed October 19, 1893. Serial No. 488,642. (No model.)

*To all whom it may concern:*

Be it known that I, LUKE ROBERTS, a subject of the Queen of England, residing at Bradford, England, have invented certain Improvements in Perambulators or Similar Vehicles, of which the following is a specification.

This invention particularly relates to improvements in perambulators and similar vehicles and its object is to provide a simple automatic brake for this class of vehicle.

The said improvements consist in the employment of brake mechanism adapted to be automatically brought into operation or put on by the weight of the body of the perambulator and to be automatically taken off or out of operation when sufficient power is applied to the handle to move the perambulator in either direction.

To carry out my invention I connect the brake to the body of the vehicle in such a manner that the whole or a portion of the weight of the body of the vehicle tends to apply the brake and I allow the handle a limited independent motion for the purpose of operating an arrangement of levers, cams, inclined planes or their equivalent for the purpose of slightly raising the body of the vehicle to take off the brake. A simple arrangement is to form one of the axles into a rocking shaft fitted with cams or their equivalent arranged to raise the body of the vehicle in relation to the said axle and I turn such axle by a lever formed by a continuation of the handle.

Reference is to be had to the accompanying sheet of drawings, forming a part of this specification, in which similar letters of reference indicate corresponding parts in each of the figures.

Figure 1, represents a side elevation of a perambulator with my improved brake applied thereto in which one of the wheels is removed to more clearly show the brake mechanism. Fig. 2, represents an end view of the same. Fig. 3, represents a plan view with the body of the vehicle removed so as to disclose the brake mechanism beneath. Fig. 4, is a view on a larger scale of the axle E and adjacent parts shown in Fig. 1.

The perambulator shown is of that well known type in which the body A is suspended by four straps B to the arms C projecting at right angles from the extremities of the curved spring D, but the brake is equally applicable to any other form of perambulator.

Instead of the spring D being rigidly secured to the axle E the spring is fixed to the cross piece F and the axle confined in the slots G. G formed in the projections H, H on the under side of the cross piece F. Each end of the axle has a pair of lugs $e, e$ on either side and an antifriction roller $i$ is mounted in each pair of lugs. Curved arms J, J are formed upon or rigidly connected to the axle E and these arms are attached to the connecting rods K and K' connecting the levers L, L and L', L' to the upper ends of which the handles M and M' are fixed. An upright piece N is formed upon or rigidly connected to each end of the cross-piece F each of which is provided with two lugs $r, r'$, adapted to receive the shank O of one of the brake shoes P, P. The brake shoes P are capable of radial adjustment in relation to the wheels R, R by means of the nuts $t, t$ (mounted upon the screwed end of the shank O) clamping the lugs $r$ between them.

The brake shoes are adjusted so that they normally press upon the wheels R, R with approximately the full weight of that end of the vehicle which is amply sufficient to check and stop the vehicle under any ordinary circumstances. But as the pairs of levers L, L and L', L', are pivoted to the brackets S, S fixed upon D these levers are free to move or vibrate to a limited extent in either direction when power is applied to either of the handles to move the vehicle. This movement is communicated to the arms J, J thereby rocking or partly turning the axle E. And the parts are so arranged that this rocking movement of the axle brings the anti-friction rollers $i$ on one side of the axle to bear upon the under side of the cross piece F so as to raise the said cross piece and lift the brake shoes carried by it clear of the wheels.

Immediately the application to the handle of power to move the vehicle is discontinued the parts assume their normal position and the brake is automatically applied.

It will be obvious that the brake is equally applicable to perambulators having only one handle.

I claim—

1. In a perambulator or similar vehicle, the combination with the body and the spring supporting said body, of the cross piece F to which said spring is attached, and the brake shoes carried by said cross piece, whereby the weight of the body will apply the brakes, substantially as shown and described.

2. In a perambulator or similar vehicle, the combination with the cross piece having the upright extensions, of the adjustable brake shoes carried by said uprights; substantially as described.

3. In a perambulator or similar article, the combination with the body, the spring supporting said body and carried by the cross piece F, of the axle held by the lugs on the cross piece, and adapted to rock therein, the upwardly extending arms rigidly attached to the axle, and the bars connected to said arms and to the lower end of the handles, whereby when the handles are moved the motion will be communicated to the axle; substantially as described.

4. In a perambulator or similar vehicle, the combination with the cross piece F, formed with uprights carrying the brake shoes, the axles mounted in lugs on the under side of the cross piece and adapted to turn therein, of the lugs on each side of the axle at each end thereof, carrying anti-friction rollers, and adapted to press against and lift the cross piece when the axle is rocked, and means for causing said rocking.

5. The combination with the cam axle E having arms J thereon of the upright pieces N, N carrying the brake shoes P, substantially as herein shown and described.

6. The combination of the axle E having projecting cams or their equivalent, of the arms J projecting therefrom adapted to be connected to and operated by the handle levers L, substantially as herein shown and described.

In testimony whereof I have hereunto set my hand in the presence of the two subscribing witnesses.

LUKE ROBERTS.

Witnesses:
DAVID NOWELL,
SAMUEL DRACUSS.